Aug. 24, 1926.
G. H. KOSTER
1,596,980
CANDY VENDER
Filed April 14, 1924
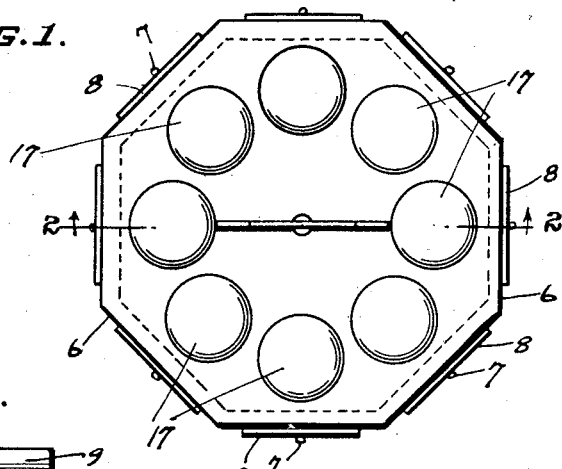
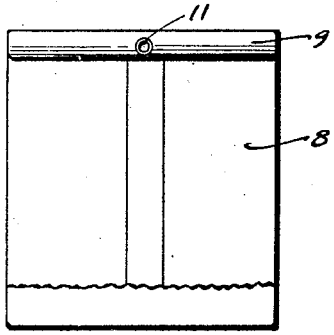
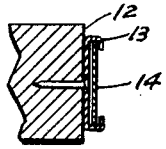
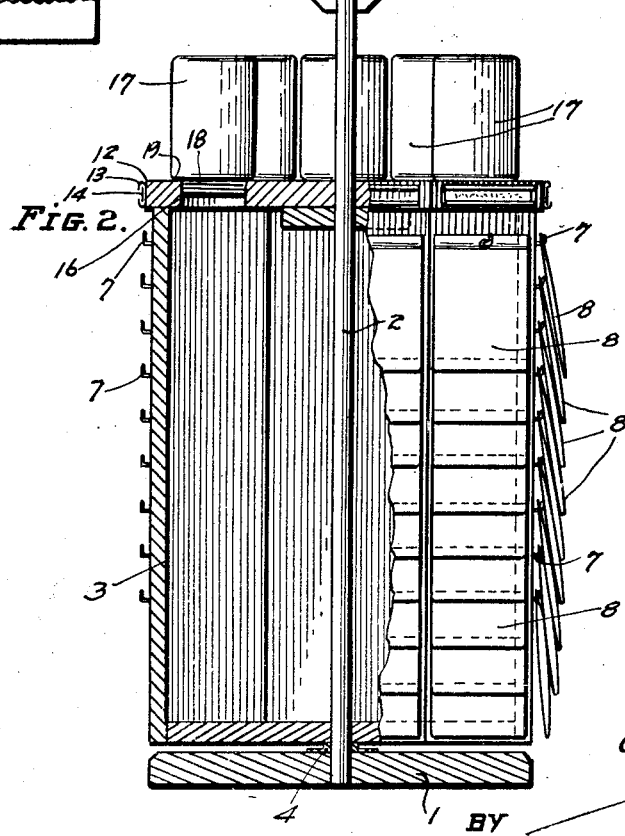
INVENTOR
GEORGE H. KOSTER
BY
ATTORNEYS Patented Aug. 24, 1926.

1,596,980

UNITED STATES PATENT OFFICE.

GEORGE H. KOSTER, OF OAKLAND, CALIFORNIA.

CANDY VENDER.

Application filed April 14, 1924. Serial No. 706,620.

The present invention relates to improvements in candy venders and its particular object is to provide a handy means for presenting candy to the public in measured quantities and for exhibiting the candy in an attractive manner.

A further object is to provide a device for this purpose which is extremely simple in construction and takes up comparatively little space on the counter of a store. A further object of the invention is to provide means allowing the candy to be offered in small bags, which on account of their cheapness do not increase the cost of handling the candy, since the candy has to be sold in bags anyhow. Further objects and advantages of my device will appear as the specification proceeds.

The preferred form of the invention is illustrated in the accompanying drawing, in which Figure 1 shows a top plan view of my device, Figure 2 a vertical section through the same taken along line 2—2 of Figure 1, Figure 3 a detail view of a bag adapted to be used in my device, and Figure 4 a detail section showing means for securing index cards to the device. While I have shown only the preferred form of the invention, it should be understood that various changes or modifications may be made within the scope of the claims hereto attached without departing from the spirit of the invention.

In its preferred form my device consists of a base plate (1) from which rises a vertical shaft (2) having a hollow column (3) rotatably mounted thereon, a flanged ring (4) being preferably provided between the column and the base plate to serve as a bearing for the column. The column, which is closed on top and at the bottom, is preferably made octagonal in form so as to present eight side elements (6) exteriorly. The number of side elements may of course be changed without departing from the spirit of the invention.

Each side element has a vertical row of nails or hooks (7) secured therein, which latter are adapted to have bags (8) suspended therefrom. The bags are preferably made as indicated in Figure 3, that is, of rectangular form with the open end folded over the material of the bag as shown at (9) and with a ring (11) piercing the folded portion and crimped to hold the folds together. This not only constitutes a very convenient means for closing the bag but also reinforces the top edge thereof and allows the bag to be suspended from the hooks (7) by slipping the ring (11) over the hook.

The top element of the column is formed with a projecting flange (12) to which small clips (13) are secured with turned over margins forming guides for small inserts (14) on which the name of the candy contained in the bags of the particular row may be printed. The hooks are placed sufficiently close that in each row a lower bag of the candy will be partly covered by the next higher one.

In the top of the column are provided a plurality of perforations (16) corresponding to the number of side elements, and transparent jars (17) or similarly formed containers for candy may be introduced with their necks (18) into the perforations so that the shoulders formed by the necks may rest on the top of the column. These jars are filled with candy corresponding to that contained in the candy bags disposed underneath the jar.

The advantages of my invention will be readily understood. Measured quantities of candy can be very easily introduced into the bags and can be handled in a much more sanitary manner than where candy is sold in bulk, without increasing the amount of labor required in handling the candy. The small bags, which are preferably made of semi-transparent paper, are very attractive in appearance and particularly attractive on account of the means for closing the same. They are readily removed from the column or stand in case a purchase is made, and new ones can be readily substituted without any effort. The name of each candy is printed above the bags and a quantity of the candy is always on display in the containers arranged on top of the device.

I claim:

1. In a vending device, a rotary platform having a plurality of transparent merchandise containers arranged thereon in peripheral relation, and a vertical row of hooks below each container whereby detachable bags having a measured quantity of merchandise corresponding in kind with the merchandise in the superimposed container may be arranged on said hooks for merchandising purposes.

2. In a vending device, an upright rotary polygonal platform having a plurality of merchandise containers arranged thereon in peripheral relation and corresponding in number to the sides of the platform, a vertical row of hooks below each container whereby detachable bags having a measured quantity of merchandise corresponding in kind to the merchandise in the superimposed container may be arranged on said hooks for merchandising purposes and a peripherally disposed tag holding clip interposed between each row of said hooks and each of said containers.

GEORGE H. KOSTER.